(12) United States Patent
Arant

(10) Patent No.: US 7,679,497 B1
(45) Date of Patent: Mar. 16, 2010

(54) RECOVERING LEGAL EVIDENCE OF UNFAVORABLE EVENTS OR CONDITIONS DURING VEHICLE OPERATIONS

(76) Inventor: Kenneth Eugene Arant, 100 Indian Shores, Lincoln City, OR (US) 97367

( * ) Notice: Subject to any disclaimer, the term of this patent is extended or adjusted under 35 U.S.C. 154(b) by 234 days.

(21) Appl. No.: 11/980,866

(22) Filed: Oct. 30, 2007

Related U.S. Application Data

(63) Continuation-in-part of application No. 10/886,739, filed on Jul. 9, 2004, now Pat. No. 7,397,496.

(60) Provisional application No. 60/562,190, filed on Apr. 15, 2004.

(51) Int. Cl.
*B60Q 1/00* (2006.01)
(52) U.S. Cl. .................. 340/435; 340/436; 340/903; 340/937; 348/143; 348/148
(58) Field of Classification Search .................. 340/435, 340/436, 903, 937; 348/143, 148, 47, 151; 701/28, 29; 362/494; 382/103, 107; 386/31
See application file for complete search history.

(56) References Cited

U.S. PATENT DOCUMENTS

| | | | |
|---|---|---|---|
| 2,202,138 A | 5/1940 | Buckham | |
| 3,539,712 A | 11/1970 | Stephens, Jr. ................. | 386/32 |
| 5,289,321 A | 2/1994 | Secor | |
| 5,497,419 A | 3/1996 | Hill ............................. | 380/200 |
| 5,528,433 A | 6/1996 | Itoh et al. .................. | 360/35.1 |
| 5,570,127 A | 10/1996 | Schmidt | |
| 5,586,063 A | 12/1996 | Hardin et al. ............... | 702/142 |
| 5,646,614 A | 7/1997 | Abersfelder et al. | |
| 5,680,123 A | 10/1997 | Lee | |
| 5,942,746 A | 8/1999 | Tsai ......................... | 250/208.1 |
| 6,151,065 A | 11/2000 | Steed et al. | |
| 6,246,933 B1 * | 6/2001 | Bague ........................ | 701/35 |
| 6,333,759 B1 | 12/2001 | Mazzilli | |
| 6,411,874 B2 | 6/2002 | Morgan et al. ................. | 701/36 |
| 6,583,730 B2 | 6/2003 | Lang et al. | |
| 6,738,088 B1 | 5/2004 | Uskolovsky et al. | |
| 6,738,089 B1 | 5/2004 | Silc | |
| 6,757,008 B1 | 6/2004 | Smith | |
| 6,812,831 B2 | 11/2004 | Ikeda | |
| 6,894,717 B2 | 5/2005 | Blakewell | |
| 6,940,423 B2 | 9/2005 | Takagi et al. | |
| 6,989,736 B2 | 1/2006 | Berberich et al. | |
| 6,990,397 B2 | 1/2006 | Albou et al. | |
| 7,046,171 B2 | 5/2006 | Yanai | |
| 7,050,089 B2 * | 5/2006 | Nakamura ................... | 348/148 |
| 7,116,803 B2 | 10/2006 | Lemelson et al. | |
| 7,126,460 B2 | 10/2006 | Yamada | |

(Continued)

FOREIGN PATENT DOCUMENTS

WO WO 9937503 A1 7/1999

*Primary Examiner*—Hung T. Nguyen
(74) *Attorney, Agent, or Firm*—Gene W. Arant

(57) ABSTRACT

A method for the driver of an automotive vehicle to avoid distraction from the task of driving, but yet to preserve and later recover legal evidence of events, objects, or conditions that may be encountered during the driving of the vehicle, by utilizing a perimeter optical viewing system in conjunction with a central digital recording system to (monitor and) record and subsequently retrieve images of those events, objects, or conditions.

6 Claims, 4 Drawing Sheets

U.S. PATENT DOCUMENTS

Figure 1:
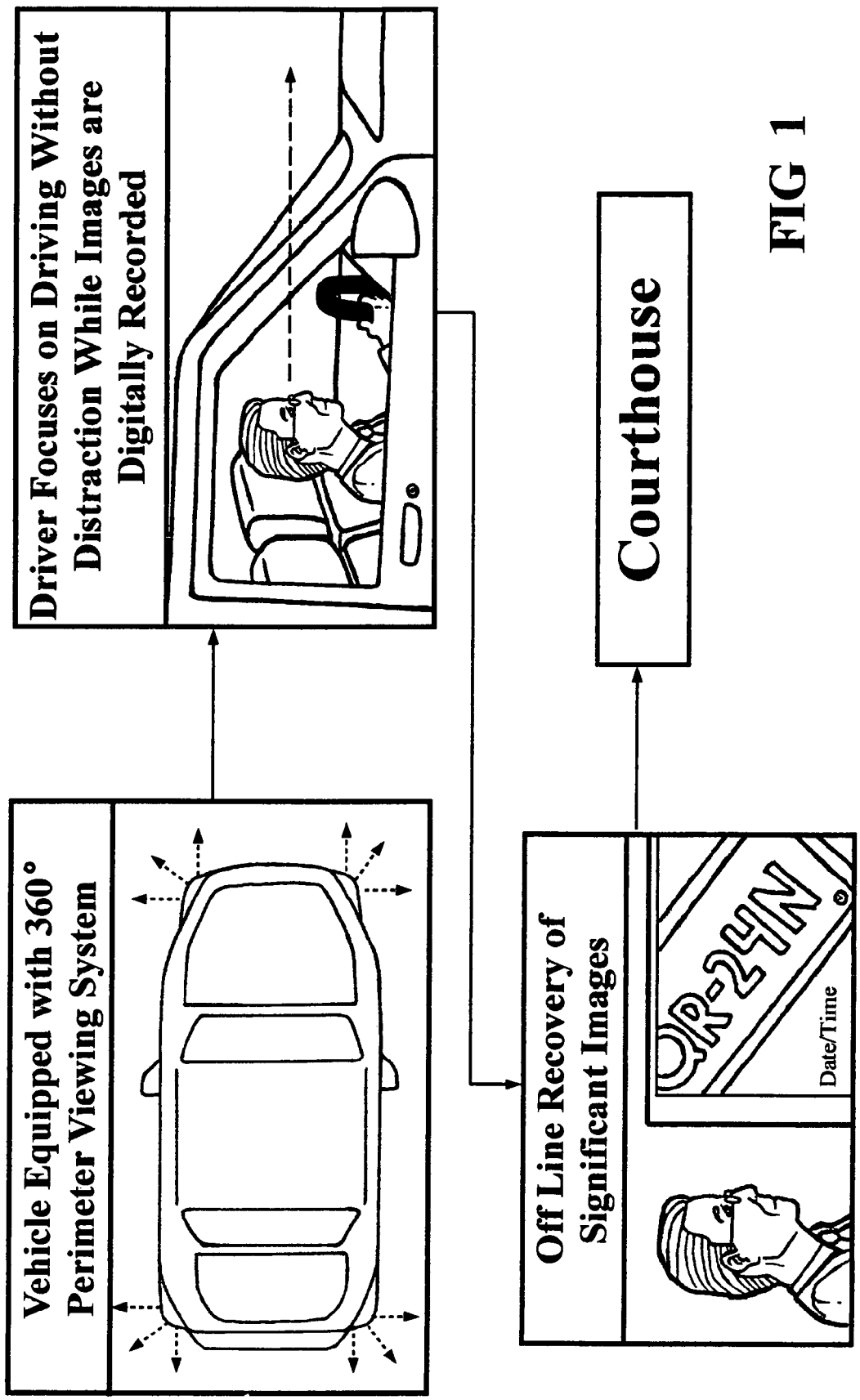

| | | |
|---|---|---|
| 7,161,616 B1 * | 1/2007 | Okamoto et al. ............ 348/148 |
| 7,227,611 B2 | 6/2007 | Hull et al. |
| 2003/0085999 A1 | 5/2003 | Okamoto et al. ............ 348/148 |
| 2004/0141312 A1 | 7/2004 | Henning et al. |
| 2004/0169762 A1 * | 9/2004 | Imoto ........................ 348/340 |
| 2005/0180149 A1 | 8/2005 | Albou et al. |
| 2005/0237385 A1 | 10/2005 | Kosaka et al. |

* cited by examiner

Camera Apparatus

RECOVERING LEGAL EVIDENCE OF UNFAVORABLE EVENTS OR CONDITIONS DURING VEHICLE OPERATIONS

PRIORITY CLAIM

This application is a Continuation-in-Part of my application Ser. No. 10/886,739 filed Jul. 9, 2004, now U.S. Pat. No. 7,397,496, and also claims the priority of my U.S. Provisional Application Ser. No. 60/562,190 which was filed Apr. 15, 2004.

FIELD OF THE INVENTION

This invention relates to automobile security, and to efficiency of legal proceedings relating to vehicular incidents.

BACKGROUND OF THE INVENTION

There are many situations where an auto accident or auto crime has occurred but no reliable evidence is available to prove what happened. Sometimes there are conditions or events that do not constitute a crime or accident, but are still sufficiently important to be recorded. It is a burdensome, difficult, and even dangerous task for a driver to try to monitor unfavorable external events, objects, or conditions that may be encountered during the driving of the vehicle. Drivers should always concentrate on the safe driving of their own vehicle. A driver's main priority should always be DRIVING THE VEHICLE CORRECTLY AND SAFELY, and their efforts should be entirely directed to that objective if possible.

Sometimes a person has been killed by a hit-and-run driver who has escaped without being identified. Sometimes there is a "road rage" event where one driver causes another to crash, or to be injured, or to incur damage to their vehicle, yet there is no means available to identify the enraged person who was at fault. Auto accidents frequently result in lawsuits being filed. Reliable witnesses are scarce. Even when a witness was admittedly present at the scene of the accident, there are still questions as to what the witness saw or perceived, whether the perceptions of the witness at that time were accurate, and whether at the later time of a deposition or court trial the witness still has a clear recollection of what was thought to have happened.

Apparatus currently available is normally mounted inside a vehicle pointing forward. Some are adjustable by control of the driver, others are activated by G-forces. Current VSAM (Video Surveillance and Monitoring) systems available for automotive use do not capture all surrounding activities of other vehicles, objects, or conditions. Drivers must rely on human eye witnesses, forensic teams, police reports, and photographs made by insurance companies to determine fault, criminal liability, or financial liability. With faster and larger vehicles, bad road conditions, or pedestrians who may be breaking the law, today's drivers are at greater legal and financial risk each time they drive, and are at the mercy of the expertise drawn from fields of law enforcement, insurance, and law.

Attorney advertisements in telephone directories and the like are voluminous and provide ample indication that auto accidents and the litigation incident thereto are big business. In other words, great amounts of time and money are spent in the preliminary investigations, litigation and court proceedings—often with incorrect, incomplete and unsatisfactory results. Because of the scarcity of reliable evidence, that entire legal process has become notoriously expensive and inefficient.

SUMMARY OF THE INVENTION

In an effort to assist law enforcement, insurance corporations, jury systems, and naturally the driver, in finding and prosecuting the offending parties, I provide a system that will capture all activity around a vehicle for extended periods of time. My method will capture an entire collision, road rage incident, or fender bender regardless of where the offending vehicle is on the road. According to my invention I provide a method for recording images of events, objects, or conditions encountered during the driving of an automotive vehicle, all without requiring the driver to be distracted from his or her main priority—which is DRIVING THE VEHICLE CORRECTLY AND SAFELY. According to my method the recorded information is recovered after the vehicle is stopped, and is then available to provide reliable evidence for use in legal proceedings.

In order to carry out my method I provide a system of apparatus to record visible conditions or activities around the perimeter of the vehicle, particularly when the vehicle is running. I prefer to have a perimeter view monitoring system that covers the entire periphery of the vehicle. There are no presently available systems that would capture an entire collision, road rage incident, or fender bender regardless of where the offending vehicle, person, object, or condition is, and that would not be required to be adjusted or would not require a G-force sensor to begin activation.

My perimeter view auto security monitoring system preferably includes a separate set of digital camera apparatus mounted at each corner of the vehicle body, each being capable of viewing at least a quarter of a circle in a horizontal plane, so that the four sets of camera apparatus collectively provide a view of activity around the entire vehicle perimeter. While each camera apparatus is normally in a fixed location on the vehicle, provision may also be made for changing its position or aspect.

In the preferred embodiment of my apparatus system the optical data (digital images) from all of the four corners of the vehicle are transmitted on a continuous and concurrent basis to a central digital recording medium to provide a complete record of the view about the vehicle perimeter. A source of electrical energy is provided to continuously energize not only the digital recording medium but also all the sets of the camera apparatus, whether or not the vehicle engine is running. When the vehicle is stopped after a trip the optical data recorded in the digital recording medium can be conveniently retrieved to provide correct and reliable information of an unfavorable external event, object, or condition that was encountered during the driving.

An important aspect of my invention is that the optical information may be acquired while the driver is driving the vehicle, but has not seen the important events, objects, or conditions that are later of interest. It is preferred to locate all of the apparatus needed for carrying out my novel method in such a way that it cannot distract the driver; in other words, it is preferably inaccessible to the driver while driving the vehicle.

According to my invention the camera apparatus at each corner of the vehicle preferably includes a pair of viewing lenses that are fixedly mounted in a common housing with their major viewing axes in generally perpendicular relation to each other to capture the optical data to be transmitted to the central recording medium. However, the position and aspect of some viewing lenses may be adjustable by the operator.

According to my method I prefer to have two viewing lenses in a corner housing at each corner of the vehicle, which have their major viewing axes separated by somewhat more than ninety degrees, in order to cover the complete perimeter of the vehicle while providing some redundancy in the optical data.

DRAWING SUMMARY

Figure 2:
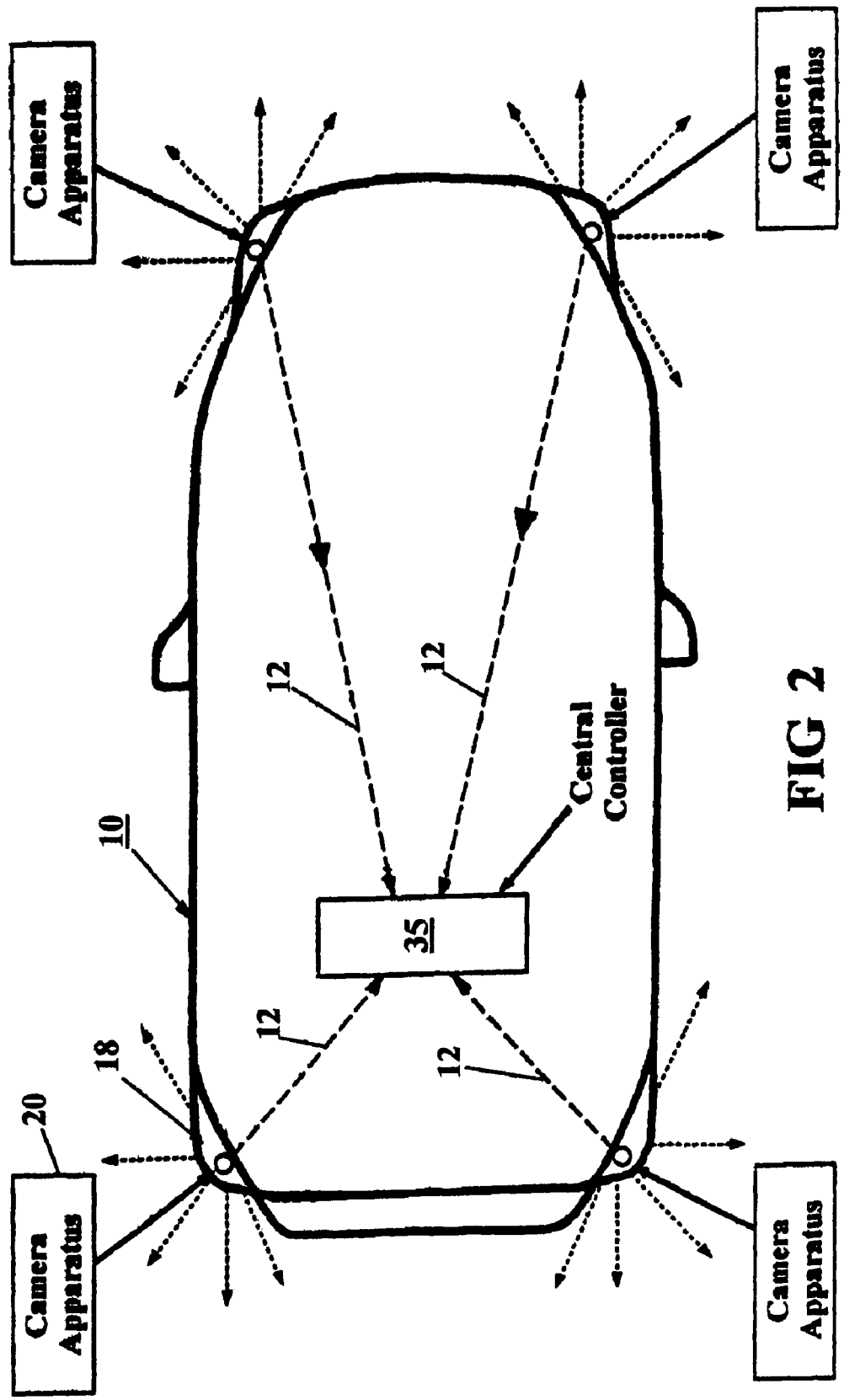
Figure 3:
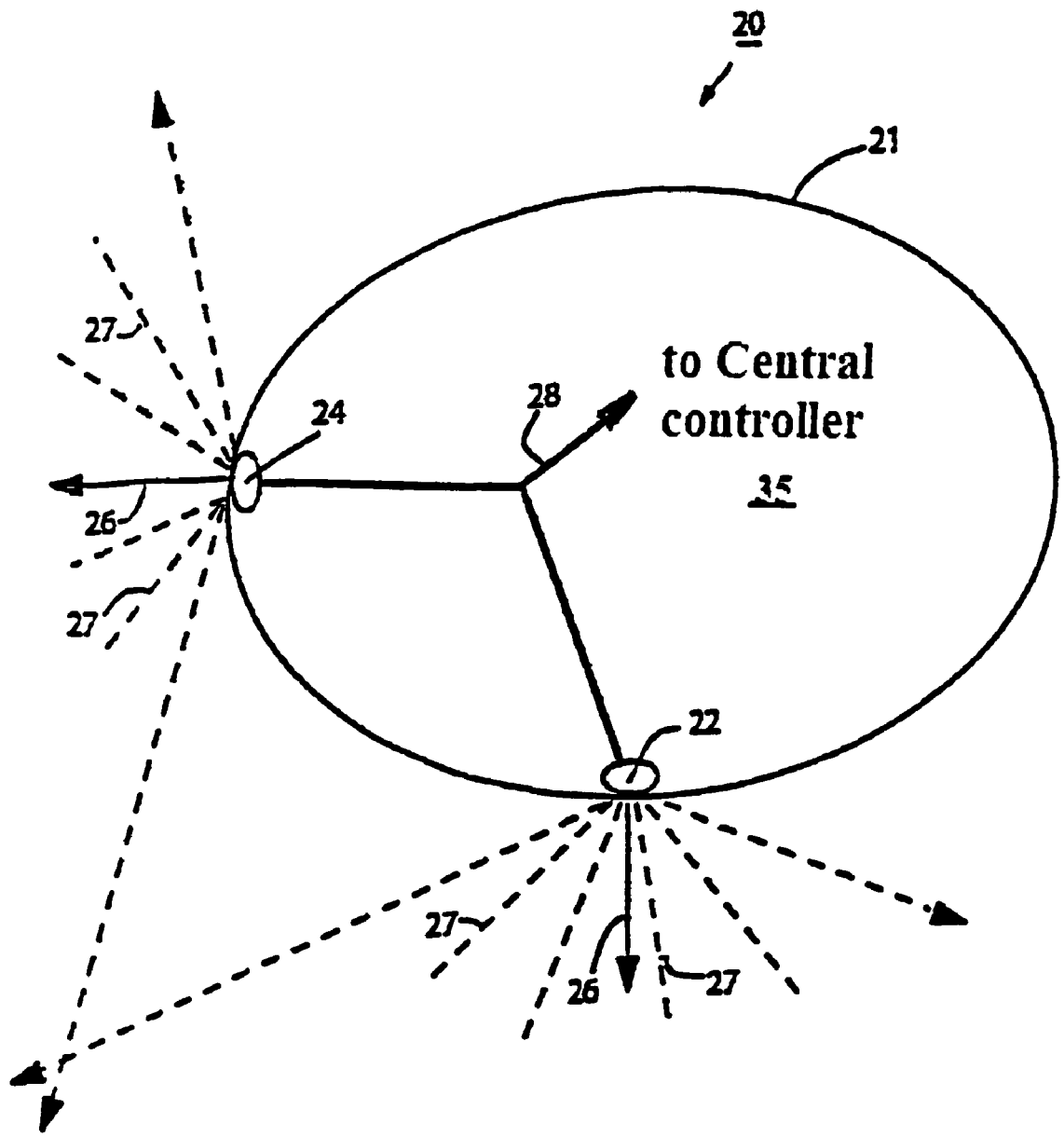
Figure 4:
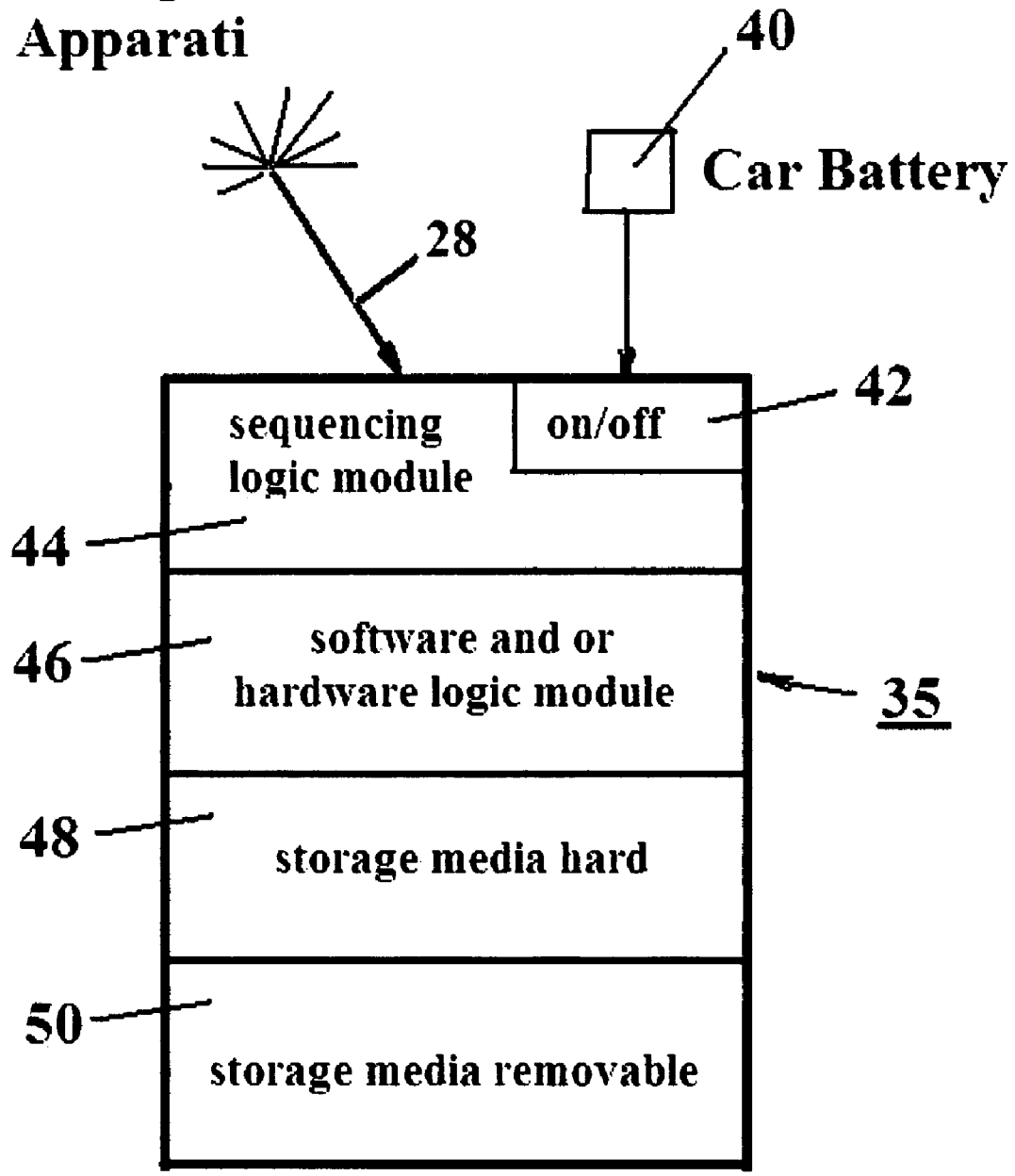

FIG. 1 is a schematic illustration of my method showing how a driver starts a trip with a vehicle that is properly equipped with a perimeter viewing system, then concentrates his or her attention on the task of driving while any unfavorable events, objects, or conditions encountered on the trip are being recorded, then upon completing the trip recovers off line the images of the things that he or she had missed seeing while driving, and thereafter uses recovered images for a legal purpose; and FIG. 2 is a schematic drawing of an apparatus system according to my invention in which separate camera apparatus are located at each separate viewing position on the vehicle, with all camera outputs being channeled to a single digital recording medium; and FIG. 3 is a schematic drawing showing a vehicle with camera apparatus at each corner, which preferably includes a pair of viewing lenses that are fixedly mounted in a common housing with their major viewing axes in generally perpendicular relation to each other to capture the optical data to be transmitted to the central recording medium; and FIG. 4 is a schematic diagram in accordance with my invention of a central controller, for recording the optical data in a properly sequenced arrangement in a digital recording medium so that it may later be recovered to carry out my novel method.

DETAILED DESCRIPTION OF AN EXEMPLARY EMBODIMENT

Reference is now made to the drawings which illustrate the method of my invention and the outline of a system of apparatus for carrying out that method. A vehicle 10 is equipped with a 360 degree perimeter viewing system. The vehicle has corner housings 18 within each of which a camera apparatus 20 is mounted. Each camera apparatus has an associated cable 28 to feed optical data to a central controller 35. The controller records the data in properly sequenced relation on storage media 48 and/or 50, so that the optical images can later be recovered in an appropriate off line process.

I provide a fully automatic system, preferably integrated into previously existing corner or side electrical housings of the vehicle, which requires no activation, no adjustment by the operator, and is not limited in terms of its useful output in the form of digital image documentation.

The successive steps of the method of the present invention are artistically illustrated in FIG. 1. The driver starts a trip in a vehicle having a 360 degree perimeter viewing system. He or she then focuses on the road ahead without any distraction by the images being optically acquired by the camera apparatus. At the same time, those images are instantly converted into digital electrical information and recorded as such. Upon completing a trip the driver utilizes appropriate off line technology to recover significant images that had been acquired during the trip. In the particular example shown in FIG. 1, a fragmentary portion of a vehicle license plate QR-24N has been recorded along with the date and time of data acquisition. That information is then taken to the police, used in a deposition, or used in a legal process at a courthouse.

FIG. 2 is a top plan view of the vehicle 10 that is equipped with a perimeter viewing and digital recording system capable of carrying out my invention. Each vehicle corner housing 18 carries camera apparatus 20 that is capable of acquiring images throughout an angular area of about 180 degrees. The optical image data from the camera apparatus 20 at each of the vehicle corners is conveyed along a data flow path 12 to a central controller 35. The central controller 35 includes both time sequencing apparatus 44 and digital recording media 48, 50, and receives the image data and records it in digital electrical form for later recovery.

FIG. 3 more specifically shows a preferred mechanical arrangement for each of the four corner housings 18 of the vehicle 10. Corner camera apparatus 20 is mounted at each of the corner housings 18. The corner housing 18 has a transparent wall 21 through which the area outside the perimeter of the vehicle may be viewed. Each corner camera apparatus includes viewing elements or lenses 22, 24, each of which may be a self-contained complete conventional digital camera apparatus. Optical data from the two viewing elements 22, 24, of the corner camera apparatus 20 is fed to the central controller 35, each being conveyed separately via a duplex cable 28. Corner housing (21) 18 may also contain one or more conventional light sources, not specifically shown, that are needed to operate the vehicle. The housing wall 21 may be specially constructed to survive a crash without damage to its interior contents.

The pair of viewing lenses (or cameras) 22, 24, are fixedly mounted within each housing 18 in generally perpendicular relation to each other so as to cooperatively view at least about a quarter circle of the perimeter of the vehicle. The major viewing axis of each lens (or camera) is identified by an arrow 26, and arrows 27 indicate the viewing area about the major axis. The viewing areas 27 of the two lenses overlap to provide a desired redundancy not only between the two viewing areas for each corner camera apparatus 20, but also for the four corners of the vehicle. A duplex cable 28 carries the optical data from the lenses 22, 24 to the central controller 35. The inputs to the central controller 35 are sequentially divided in an appropriate manner before being recorded in actual time in a digital memory, so that they can later be recovered, in an appropriate off-line operation.

The difficulty in designing a system for such automotive use is one of system placement. Where would the cameras be installed that would be optimal in terms of installation, output, protection, and aesthetics? By utilizing the current headlight, brake light, and/or side marker electrical housings we have a natural place to integrate the miniature lenses. The approximate vertical center of an automobile is where such housings are currently installed, and effectively so. Problems arise when roofs, doors, or bumpers are considered for installing the apparatus needed to carry out my method, so those locations are possible but are not presently preferred.

My total perimeter view (TPV) idea uses a fully automatic digital security recording system that is preferably integrated into the existing corner or side electrical housings using an eight sector format. This makes any adjustment by the driver unnecessary, will not require any type of pre-activation system, nor would the output in the form of digital documentation be limited based on the position of any other vehicle, person, object, or road condition. The resulting documentation is a 360 record over time of all other vehicles, persons, objects, or conditions. Each sector may later be analyzed to determine the physics or identity of unlawful acts or collisions perpetrated or caused by any other vehicle, person, object or road condition. This will eliminate much of the need for forensics team reconstructions, computer simulations, police reports, and eye witnesses, including the time and financial resources for such investigations, reconstructions, simulations, and reports, or for fallible jury systems that may produce unsatisfactory verdicts.

Central recorder 35 shown in schematic form in FIG. 4 includes a vehicle battery 40 to energize the corner camera apparati 20 as well as the central controller. A switch 42 to control the electrical energy from the battery is normally closed both when the vehicle is running and when it is parked, and can survive a crash and still remain closed. The battery cannot be disconnected except under control of the vehicle operator, and continuously energizes not only the digital recording media 48, 50, but also all of the camera apparatus including the viewing lenses, whether or not the vehicle engine is running. The recording media may preferably include a hard disc drive memory 48 located in the trunk of the vehicle, as well as a separate removable memory 50.

The software system in the central controller 35 includes a sequencing logic module 44 and hardware and/or software logic module 46. It will sequentially switch inputs from among the various cameras while concurrently recording actual time. A separate track in the digital memory 48, 50, is preferably used to separately record the optical data gathered by each one of the lenses (or cameras) 22, 24. Thus there (is) are separate node files to provide eight separate tracks of real-time recorded data obtained from the respective lenses (or cameras) 22, 24. This facilitates recovery of the image data after the vehicle is stopped.

Alternatively, in the illustrated apparatus each lens 22, 24, may feed a bundle of optical fibers sufficiently large to carry enough pixels to convey a complete image to a single digital camera contained within the central controller. The duplex cable 28 then contains two such large bundles of fibers to serve the two lenses. The vehicle has means operable while the vehicle is moving for electrically energizing both the camera apparatus and the central recording medium, so as to acquire optical information of images captured by the lenses, convert the optical information into electrical form, and record the electrical information in the central recording medium.

Although I prefer to have viewing lenses around the entire periphery of the vehicle, it will be understood that for certain vehicles operating in certain conditions it may not be necessary for the viewing lenses to surround the entire vehicle.

An important aspect of my invention is that the optical information may be acquired while the driver is driving the vehicle, but has not seen the important events, objects, or conditions that later become of particular interest. It is much preferred to locate all of the apparatus needed for carrying out my novel method in such a way that it cannot distract the driver; in other words, it is preferably inaccessible to the driver while driving the vehicle. It is preferred to have the battery switch located in a position that is inaccessible to the driver while driving.

METHOD OF OPERATION. Thus according to my invention I provide a plurality of optical viewing lenses mounted around the periphery of the vehicle to record all visible activity around its perimeter, not only when it is being driven or its engine is idling but also when it is stopped and the engine is not running. The optical data from all of the viewing lenses are transmitted on a continuous and concurrent basis to a central digital recording medium located in a secure location within the vehicle. When the vehicle is safely parked in the owner's garage, or other convenient location, the battery connection can switched off and the removable storage media 50 removed from the vehicle. Optical data recorded in the digital recording medium is then conveniently retrieved using appropriate off-line technology to provide correct and reliable real-time optical information of unfavorable events, objects, or conditions that may have been encountered during the driving of the vehicle. The recovered images of things that the driver had missed seeing while driving are then available to be used for a legal purpose, and can be adequately authenticated for legal purposes, because the driver had been in control of the vehicle even while not disrupting the data recording operation.

Although a presently preferred form of my invention has been disclosed herein in order to comply with the patent laws, it will nevertheless be understood that other modifications should be apparent to those skilled in the art, and that the scope of my invention is to be judged only by the appended claims.

PART NUMBERS 10 vehicle
QR-24N license plate
12 data flow paths to central controller
18 corner housings of vehicle
20 camera apparatus at each corner
21 transparent wall of corner housing
22, 24 viewing elements (lenses) mounted in corner housings
26 arrow showing major viewing axis of lens
27 other arrows showing viewing area about axis 26
28 cable to feed data from each camera to 12, 35
35 central controller
40 vehicle battery
42 switch
44 sequencing logic module
46 software and/or hardware logic module
48 storage media hard
50 storage media removable
QR-24N license plate
C:\wp\51\keapa2\d8

I claim:

1. A method for the driver of an automotive vehicle to avoid distraction from the task of driving but yet be able to record all external events, objects, or conditions that may be encountered during the driving of the vehicle, and to record and later recover legal evidence of those conditions, objects, or events using a controller, comprising the steps of:

(a) supporting a plurality of optical viewing lenses in fixed positions upon the vehicle around its periphery such that each lens has a fixed field of view in a horizontal plane relative to the vehicle;

(b) positioning a central digital recording medium within the automotive vehicle in a secure location;

(c) continuously energizing both the digital recording medium and all of the viewing lenses while the vehicle is moving so as to acquire optical information of images captured by the lenses, convert the optical information into electrical form in actual time, and record the electrical information in a time division process in actual time on separate tracks in the central recording medium;

(d) when the vehicle is stopped, retrieving the thus-recorded electrical information from the separate tracks of the recording medium and reconstituting for each individual viewing lens the images that were captured in its corresponding fixed field of view; and (e) wherein at least one vehicle corner has a pair of viewing lenses mounted with their major viewing axes in generally perpendicular relation to each other so as to provide overlapping fields of view to cooperatively view at least about a quarter circle of the perimeter outside the vehicle in a horizontal plane relative to the vehicle.

2. The method of claim 1 wherein the fixed fields of view of all of the viewing lenses together cooperatively span the entire periphery of the vehicle.

3. The method of claim 1 wherein on each of at least two corners of the vehicle a pair of viewing lenses are mounted with their major viewing axes in generally perpendicular relation to each other so as to provide overlapping fields of view to cooperatively view at least about a quarter circle of the perimeter outside the vehicle in a horizontal plane relative to the vehicle.

4. A method for the driver of an automotive vehicle to record all external events, objects, or conditions that may be encountered during the driving of the vehicle, and later recover legal evidence of those conditions, objects, or events using a controller, comprising the steps of:
  (a) supporting a plurality of optical viewing lenses in fixed positions around the periphery of the vehicle such that each lens has a fixed field of view in a horizontal plane relative to the vehicle, including on each of at least two corners of the vehicle a pair of viewing lenses that are mounted with their major viewing axes in generally perpendicular relation to each other so as to cooperatively view at least about a quarter circle of the perimeter outside the vehicle in a horizontal plane relative to the vehicle;
  (b) positioning a central digital recording medium within the automotive vehicle in a secure location;
  (c) continuously energizing both the digital recording medium and all of the viewing lenses while the vehicle is moving so as to acquire optical information of images captured by the lenses, convert the optical information into electrical form in actual time, and record the electrical information in a time division process in actual time on separate tracks in the central recording medium;
  (d) when the vehicle is stopped, retrieving the thus-recorded electrical information from the separate tracks of the recording medium and reconstituting for each individual viewing lens the images that were captured in its corresponding fixed field of view; and
  (e) wherein at least one vehicle corner has a pair of viewing lenses mounted with their major viewing axes in generally perpendicular relation to each other so as to provide overlapping fields of view to cooperatively view at least about a quarter circle of the perimeter outside the vehicle in a horizontal plane relative to the vehicle.

5. A method for the driver of an automotive vehicle to record all external events, objects, or conditions that may be encountered during the driving of the vehicle, and later recover legal evidence of those conditions, objects, or events using a controller, comprising the steps of:
  (a) supporting a plurality of optical viewing lenses in fixed positions upon the vehicle around its periphery such that each lens has a fixed field of view in a horizontal plane relative to the vehicle, the fields of view of all of the viewing lenses together cooperatively spanning the entire periphery of the vehicle;
  (b) positioning a central digital recording medium within the automotive vehicle in a secure location;
  (c) while the vehicle is moving, continuously energizing through a switch controlled only by the driver both the digital recording medium and all of the viewing lenses so as to acquire optical information of images captured by the lenses, convert the optical information into electrical form in actual time, and record the electrical information in a time division process in actual time on separate tracks in the central recording medium;
  (d) when the vehicle is stopped, retrieving the thus-recorded electrical information from the separate tracks of the recording medium and reconstituting for each individual viewing lens the images that were captured in its corresponding fixed field of view; and
  (e) wherein at least one vehicle corner has a pair of viewing lenses mounted with their major viewing axes in generally perpendicular relation to each other so as to provide overlapping fields of view to cooperatively view at least about a quarter circle of the perimeter outside the vehicle in a horizontal plane relative to the vehicle.

6. The method of claim 5 wherein on each of at least two corners of the vehicle a pair of viewing lenses are mounted with their major viewing axes in generally perpendicular relation to each other so as to provide overlapping fields of view.

* * * * *